May 1, 1951 T. H. HOWE 2,551,212
DIAPHRAGM PRESSURE INDICATING INSTRUMENT
Filed May 30, 1945

INVENTOR.
THOMAS HENRY HOWE
BY
Raymond W Junkins
ATTORNEY

Patented May 1, 1951

2,551,212

UNITED STATES PATENT OFFICE 2,551,212

DIAPHRAGM PRESSURE INDICATING INSTRUMENT

Thomas Henry Howe, Croydon, England, assignor to Bailey Meter Company, Cleveland, Ohio, a corporation of Delaware Application May 30, 1945, Serial No. 596,639½
In Great Britain June 2, 1944

8 Claims. (Cl. 73—407)

This invention relates to pressure indicating instruments, an object being the provision of improved instruments of the flexible diaphragm type. A more specific object of the invention is to provide adjusting means whereby the zero or normal adjustment of such an instrument may be varied without changing the zero or normal position of the diaphragm of the instrument.

The present invention includes a unit having a flexible diaphragm adapted to be subjected to fluid pressure or suction or a pressure difference and to operate through means including a rotary device to effect the indication, and adjusting means arranged to vary the positioning of the unit relatively to the axis of rotation of the rotary device and thereby to vary the zero or normal adjustment of the instrument.

The invention also includes an arm which is adjustably mounted at one end and the free end of which may be deflected against a spring biasing force by the action of a connection at an intermediate swing thereof with the diaphragm, a pivoted lever biased to a zero or normal position and connected with the arm at the free end thereof by flexible means arranged to wind upon and unwind from a pulley or drum mounted on or formed by the lever axle, a hinge remote from the free end of the arm about which the unit and arm may be rocked and means for varying the setting of the unit about the hinge and the zero or normal adjustment of the instrument.

Figure 1:
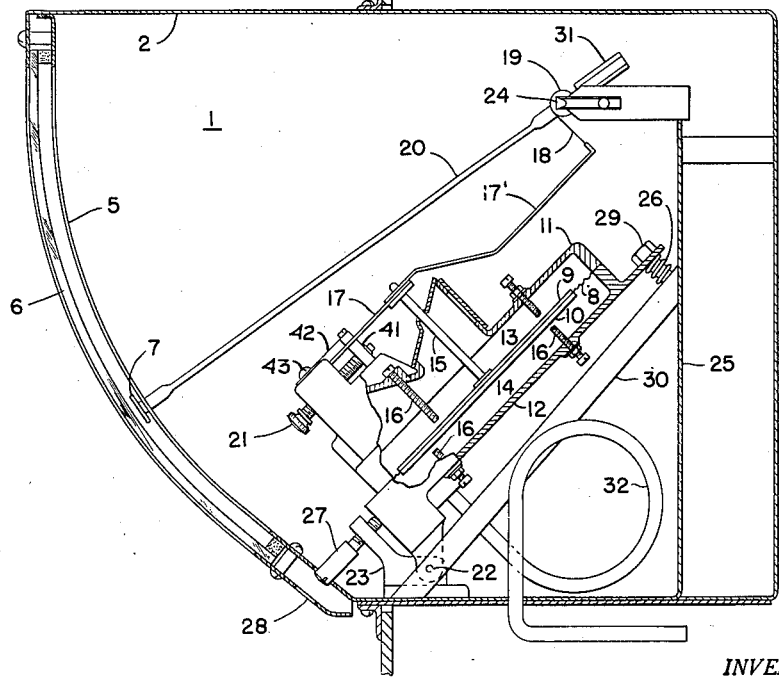
Fig. 1 is a partially sectioned elevation of an instrument for a single pressure or suction.

Referring now particularly to Fig. 1, I show therein an indicating instrument generally indicated at 1 having a protecting casing 2 and arranged for mounting on an instrumet panel board 3 by means of a flange 4. The arrangement is such that (looking at the drawing) that portion of the assembly 1 to the right of the panel board 3 extends behind the panel board, whereas that portion of the assembly 1 to the left of the panel board 3 projects through the face of the panel for observation by an operator. The observable face of the instrument 1 includes a graduated scale 5 observable by the operator through a glass 6; both the scale and the glass being curved to the radius of a pointer 7 which is adapted to be moved along a path between the scale 5 and glass 6 for cooperation with the scale 5.

In general, the instrument 1 may include a single pressure responsive mechanism with scale and pointer; or may include a number of such units in parallel normal to observation of the drawing. Preferably the assembly 1 is mounted on the panel board 3 at an elevation slightly above normal eye level so that the observer readily sees the entire scale 5 as well as the pointer 7 in any position of its travel along the scale 5.

In one form of indicating instrument in accordance with the invention, a diaphragm 8 of elongated form has its central portion clamped between reinforcing plates 9 and 10 and its edges clamped between two cover members 11 and 12, which together with the plates and diaphragm form two chambers 13 and 14. In Fig. 1 chamber 14 may be subjected to a fluid pressure or to a vacuum, whereas chamber 13 communicates with the atmosphere, thus providing that the diaphragm 8 is subjected to a pressure or suction referred to the atmosphere as a basis.

Secured to the center of the plates and extending normal thereto within the chamber 13 is a member 15 for transmitting motion of the assembly 8, 9 and 10 in the direction of the longitudinal axis of the member 15. The movements of the diaphragm are suitably limited by adjusting stops in the form of screws as 16 which thread through the cover members 11 and 12 and are adapted to limit the travel of the clamping plates 9, 10.

A motion transmitting arm 17 is in the form of a spring mounted on the cover member of the chamber 13, the spring arm 17 being constituted by a strip or flat spring and a rigid extension 17' thereof to which a flexible means 18 is connected. The flexible means 18 may be a cord, minute chain, hair wire, or the like, fastened to and wrapped partially around the periphery of a drum 19 formed on the axle of the pointer arm 20. The direction of wrap of the flexible means 18 around the drum 19 determines the direction of movement of the elements 20, 7 relative to the index 5. As shown in Fig. 1, a clockwise deflection of the part 17' results in a counterclockwise movement of the drum 19 and of the pointer arm 20.

The effective length of the strip calibrating spring 17 is adjustable. Thus the strip spring fits through a clearance provided between a block 41 and the plate 42 clamped to the block 41 and formed with a rearward slotted extension in which screw 43 acts as a guide and an adjusting screw 21 which screws through the cover member 11 of the chamber 13 adapted to move the block 41 and the plate 42 longitudinally along the leaf or flat spring 17 to vary the effective length of said calibrating spring between the clamping block 41 and the member 15.

The entire unit comprising the major parts 8, 9, 10, 11, 12, 15, etc. is hinged as at 22 to a bracket 23 carried by the casing 2. The hinge 22 for the unit and the bearings 24 for the parts 19, 20 are mounted respectively at the ends of a right angled bracket 25, the bracket itself being secured within the casing 2 of the instrument. The unit is spring biased, as by the spring 26, against an adjusting screw 27 for rocking the unit about its hinge 22. The adjusting screw 27 and an aperture 28 in the casing of the instrument are so positioned that the screw is accessible from a location in front of the glass 6 whereby the zero or normal adjustment may be observed on the scale 5.

Thus the unit is mounted at an inclination of approximately forty-five degrees and the cover member 12 is formed with a lug through a hole in which passes a stud 29 screwed into the bracket 30 while a helical compression spring 26 on the stud 29 urges the lug toward the head of the stud. The hinged member secured to the bracket is also formed with a lug through which the adjusting screw 27 passes, so that the end of the screw 27 bears against the lower end of the cover 12. The head of the screw passes through a hole in an inner part of the casing and is accessible through the hole 28 in the outer portion of the casing. When the screw 27 is screwed inwardly the unit is caused to rotate clockwise about its hinge 22 and against the action of the spring 26. When the screw 27 is screwed outwardly the spring 26 causes the unit to follow up the withdrawal of the screw. Since the hinge is remote from the free end of the spring arm the angular movement of the unit causes a substantial lateral movement of the end of the spring arm, and the end of the spring arm is located relative to the pulley or drum 19 in such a way that the movements are substantially directly toward or away from the pulley or drum.

The pivoted lever 20 is formed at one end to include the pointer 7 and is provided at the other end with a counterweight 31 for biasing the lever to the zero or normal position relative to the axis 24 and the scale 5. To the lever axle 24 is clamped the drum or pulley 19 and the flexible means 18 which winds upon the drum is suitably in the form of a tape or flexible means.

When the instrument is to serve as a pressure or vacuum gage provision is made for placing only the chamber 14 under pressure or vacuum, and the link 15 connecting the diaphragm 8 with the lever 17 extends through an aperture in the cover member 11 and is directly joined by a hinged connection wtih the spring arm 17, 17'. Connection is made to the chamber 14 through a connection tube 32 of looped or sinuous form so that the tube possesses the degree of resilience necessary to accommodate the movements of the unit about its hinge 22.

Figure 2:
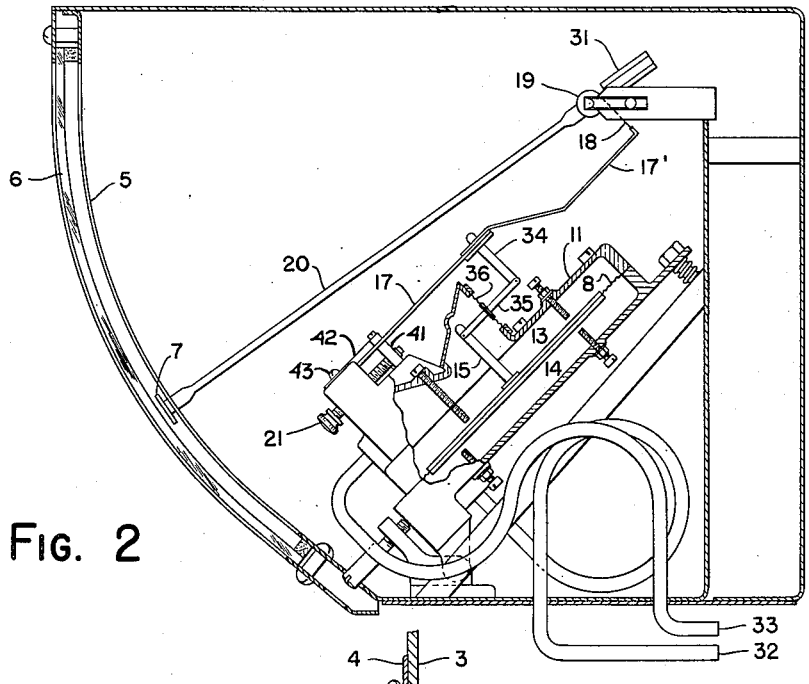
Fig. 2 is a similar elevation of an instrument for a pressure difference.

Referring now to Fig. 2, I show therein an instrument adapted to have its diaphragm 8 subjected to a pressure difference between two pressures admitted to the chambers 13 and 14 through connections 33, 32 respectively. The pressures imposed upon the chambers 13, 14 may be greater or lesser than the atmosphere, or one may be above atmospheric and the other below atmospheric. It is not contemplated that one of the pressures would be that of the atmosphere, for in comparing a given positive or negative pressure with the pressure of the atmosphere I utilize the arrangement of Fig. 1.

In Fig. 2 the link 15 is coupled to the spring arm 17, 17' through a link 34 and a pivotally connected lever 35 carried by a flexible diaphragm 36 which constitutes a sealing wall, the plane whereof is substantially normal to the plane of the diaphragm 8.

Thus the cover member 11 of the chamber 13 is formed with a wall upstanding relative to the main surface of the member and formed with the sealing diaphragm 36 through which the lever 35 may pivot to transmit motion of the diaphragm 8 to the lever arm 17, 17'. With the arrangement described, any force acting on the auxiliary diaphragm 36 as a result of pressure or vacuum within the chamber 13 is ineffective to disturb the reading of the instrument since the force acts at right angles to that exerted by the diaphragm 8.

Conveniently, in order that the instrument may be adapted for use either as a vacuum or a pressure gage, or as a gage for measuring pressure difference, the cover member 11 of the chamber 13 is formed with two alternative transmission apertures, one adapted for the passage of the link 15 extending normal to the diaphragm 8 and connecting the diaphragm to the spring arm 17; and the other adapted for the passage through the flexible sealing wall 36 of the pivoted lever 35 linked at its end respectively with the diaphragm 8 and with the spring arm 17. When the instrument is to serve as a pressure or vacuum gage the latter transmission aperture may be closed by a circular plate, and when the instrument is to serve as a gage for measuring pressure difference the former aperture is closed by a cover plate provided with a gasket for making a fluid tight joint with the cover member.

When the instrument is to serve as a pressure gage the zero or normal position of the pointer 7 is at the lower end of the scale 5 and the tape 18 is wound upon the pulley or drum 19 in one direction, while if the instrument is to serve as a suction gage the normal or zero position of the pointer 7 is at the upper end of the scale 5 and the tape 18 is wound upon the drum or pulley 19 in opposite direction. When the instrument is to indicate a pressure difference the pressure difference may always exert a resultant force on the diaphragm in one direction or the direction of the force may vary and the normal or zero position of the pointer and the direction in which the tape is wound on the pulley or drum will be determined to suit a particular condition of operation and the manner in which the first and second chambers are connected with the source of pressure difference.

In the instrument described the zero or normal adjustment of the instrument may be accurately, quickly and conveniently varied without moving the diaphragm from the normal or zero position thereof calculated to result in the best operation of the instrument; the same instrument with small modifications may be used as a pressure gage, a vacuum gage, or as a gage for determining pressure difference, and is suitable for use over substantial ranges of vacuum, pressure and pressure difference; and backlash between the spring arm and the level is avoided, while backlash between the diaphragm and the spring arm is ineffective to disturb the accuracy of the instrument.

What I claim as new, and desire to secure by Letters Patent of the United States, is:

1. An instrument comprising a unit including a pressure responsive member, means for subjecting said pressure responsive member to a pressure to be measured, an indicator, means for pivotally supporting said indicator, means including a flexible member for connecting said pressure responsive member to said indicator so as to effect an angular movement of the latter proportional to the movement of said pressure responsive member, and adjusting means arranged to vary the position of said unit relative to the pivot axis of said indicator and thereby to vary the zero or normal adjustment of the instrument.

2. An instrument comprising a unit including a flexible diaphragm, means for subjecting said diaphragm to a pressure to be measured, an arm connected at one end to said unit and having a yielding free end portion, means for connecting an intermediate point of said arm to said diaphragm, a lever pivotally supported adjacent the free end portion of said arm and biased toward a zero or normal position, a pulley arranged with its axis coinciding with the pivotal axis of said lever and operatively connected to the latter, flexible means arranged to wind upon and unwind from said pulley and connected to the free end of said arm, means for pivotally supporting said unit at a point remote from the free end of said arm, and means for varying the setting of said unit about its pivotal support.

3. An instrument comprising a unit including a pressure responsive member, means for subjecting said pressure responsive member to a pressure to be measured, an indicator, means for pivotally supporting said indicator, a pulley fixed to said indicator and having its axis coinciding with the axis of pivotal movement of the latter, a spring arm anchored at one end to said unit, means for connecting said pressure responsive member to said spring arm at a point between its ends, flexible means connected to the free end of said spring arm and to the periphery of said pulley, said flexible means being arranged to wind on and unwind from said pulley, means for pivotally supporting said unit, and means including an adjusting screw for adjusting said unit on its pivotal supporting means.

4. An instrument comprising a unit including a pressure responsive member, means for subjecting said pressure responsive member to a pressure to be measured, an indicator, means for pivotally supporting said indicator, a pulley fixed to said indicator and having its axis coinciding with the axis of pivotal movement of the latter, a spring arm anchored at one end to said unit, means for connecting said pressure responsive member to said spring arm at a point between its ends, means carried by the unit and slidably positionable by a manually manipulated screw means to form a cantilever fulcrum for the spring arm at one of a plurality of points intermediate its anchored end and the point of connection to the pressure responsive member, flexible means connected to the free end of said spring arm and to the periphery of said pulley, said flexible means being arranged to wind on and unwind from said pulley, and adjusting means arranged to vary the position of said unit relative to the pivot axis of said indicator.

5. An instrument comprising a unit including a diaphragm, means for subjecting said diaphragm to a pressure to be measured, a yieldable arm connected at one end to said unit and having its other end free, means for connecting said arm at a point between its ends to said diaphragm, fulcrum means carried by the unit and slidably positionable along said yieldable arm by a manually manipulated screw means to provide a cantilever fulcrum at any of a plurality of positions intermediate its unit-controlled end and the point of connection to the diaphragm, a lever, means for pivotally supporting said lever, a pulley operatively connected to said lever and rotatably supported so that a point in its periphery lies in a plane normal to said arm at the free end of the latter, flexible means wound upon said pulley and connected to the free end of said arm, means for pivotally supporting said unit at a point remote from the free end of said arm, and means for varying the setting of said unit about its pivotal support.

6. An instrument comprising a unit including a diaphragm, means for subjecting said diaphragm to a pressure to be measured, a yieldable arm connected at one end to said unit and having its other end free, means for connecting said arm at a point between its ends to said diaphragm, fulcrum means carried by said unit and slidably adjustable along said yieldable arm between the connected end and the point of connection to said diaphragm by a manual screw means, a cantilever fulcrum, a lever, means for pivotally supporting said lever on said cantilever fulcrum, flexible means arranged to wind upon and unwind from a point operatively connected to said lever and connected to the free end of said arm so as to effect an angular movement of the latter proportional to the movement of said lever, means for pivotally supporting said unit at a point remote from the free end of said arm, and means for varying the setting of said unit about its pivotal support.

7. An instrument comprising a unit including a diaphragm and pressure chambers at opposite sides thereof, means for subjecting said chambers to pressures so as to produce on said diaphragm a pressure differential varying in accordance with a condition to be measured, an arm connected at one end to said unit and having its other end free, fulcrum means carried by the unit in engagement with the yieldable arm and slidably positionable by a manually manipulated screw means at any of a plurality of points intermediate the unit-connected end and the point of connection to the diaphragm, a flexible member arranged in a plane normal to the plane of said diaphragm and forming a portion of the wall of one of said pressure chambers, means for connecting said arm at a point between its ends to said diaphragm, said last mentioned means including a connecting member extending through said flexible member, an indicator, means for pivotally supporting said indicator, means connecting the free ends of said arm to said indicator for actuating the latter, and adjusting means arranged to vary the position of said unit relative to the pivot axis of said indicator.

8. An instrument comprising a unit including a diaphragm and pressure chambers at opposite sides thereof, means for subjecting said chambers to pressures so as to produce on said diaphragm a pressure differential varying in accordance with a condition to be measured, an arm connected at one end to said unit and having its other end free, a flexible member arranged in a plane normal to the plane of said diaphragm and forming a portion of the wall of one of said pressure chambers, means for connecting said arm at a point between its ends to said diaphragm, said last mentioned means including a connecting member extending through said flexible member, an indicator, means for pivotally supporting said indicator, a pulley operatively connected to said indicator and rotatably supported adjacent to the free end of said arm, flexible means wound upon said pulley and connected to the free end of said arm, means carried by the unit and slidably positionable by a manually manipulated screw means in its engagement of the arm at any of a plurality of points intermediate the unit-connected end and its point of connection to the diaphragm for varying its effective length, means for pivotally supporting said unit at point remote from the free end of said arm, and means for varying the setting of said unit about its pivotal support.

THOMAS HENRY HOWE.

REFERENCES CITED

The following references are of record in the file of this patent:

UNITED STATES PATENTS

| Number | Name | Date |
|---|---|---|
| Re. 19,902 | Sprague et al. | Mar. 24, 1936 |
| 2,081,950 | Nesbitt | June 1, 1937 |
| 2,090,160 | Spitzglass et al. | Aug. 17, 1937 |
| 2,138,152 | Grisdale | Nov. 29, 1938 |
| 2,199,013 | Sprague et al. | Apr. 30, 1940 |
| 2,340,395 | Lindemann | Feb. 1, 1944 |
| 2,366,566 | Shivers | Jan. 2, 1945 |

FOREIGN PATENTS

| Number | Country | Date |
|---|---|---|
| 187,283 | Great Britain | Oct. 20, 1922 |
| 632,245 | France | Oct. 1, 1927 |

OTHER REFERENCES

Hays Indicating and Recording Gages (page 10) by The Hays Corporation, Michigan City, Indiana (copy of which received in Division 36, U. S. Patent Office Sept. 27, 1935, and classified in Class 73, subclass 408).